(12) United States Patent  
Jäger

(10) Patent No.: US 7,603,776 B2
(45) Date of Patent: Oct. 20, 2009

(54) METHOD FOR MANUFACTURING A RIM

(75) Inventor: Gerrit Jäger, Péry (CH)

(73) Assignee: DT Swiss Inc., Grand Junction, CO (US)

(*) Notice: Subject to any disclaimer, the term of this patent is extended or adjusted under 35 U.S.C. 154(b) by 229 days.

(21) Appl. No.: 11/519,306

(22) Filed: Sep. 12, 2006

(65) Prior Publication Data

US 2007/0057567 A1   Mar. 15, 2007

(30) Foreign Application Priority Data

Sep. 13, 2005   (DE)   .................. 10 2005 043 755

(51) Int. Cl.
*B21K 1/38*   (2006.01)

(52) U.S. Cl. .................. 29/894.35; 264/257; 264/258; 301/95.101; 301/95.102; 301/95.103

(58) Field of Classification Search ................
29/894.35–894.354; 301/95.1–95.107, 58;
264/257, 258, 314
See application file for complete search history.

(56) References Cited

U.S. PATENT DOCUMENTS 5,234,259 A * 8/1993 Nishimuro et al. ..... 301/64.701
6,761,847 B2 * 7/2004 Meggiolan .................. 264/257

* cited by examiner

*Primary Examiner*—Rick K Chang
(74) *Attorney, Agent, or Firm*—Greer, Burns & Crain, Ltd.

(57) ABSTRACT

A rim and a method for manufacturing a rim in particular for bicycles in which first a rim body is manufactured having a hollow space with a radially outer and a radially inner hollow-space wall. The radially outer hollow-space wall has a diameter matched to the diameter of a tube tire and the radially inner hollow-space wall has a diameter matched to the diameter of a wire tire.

8 Claims, 2 Drawing Sheets

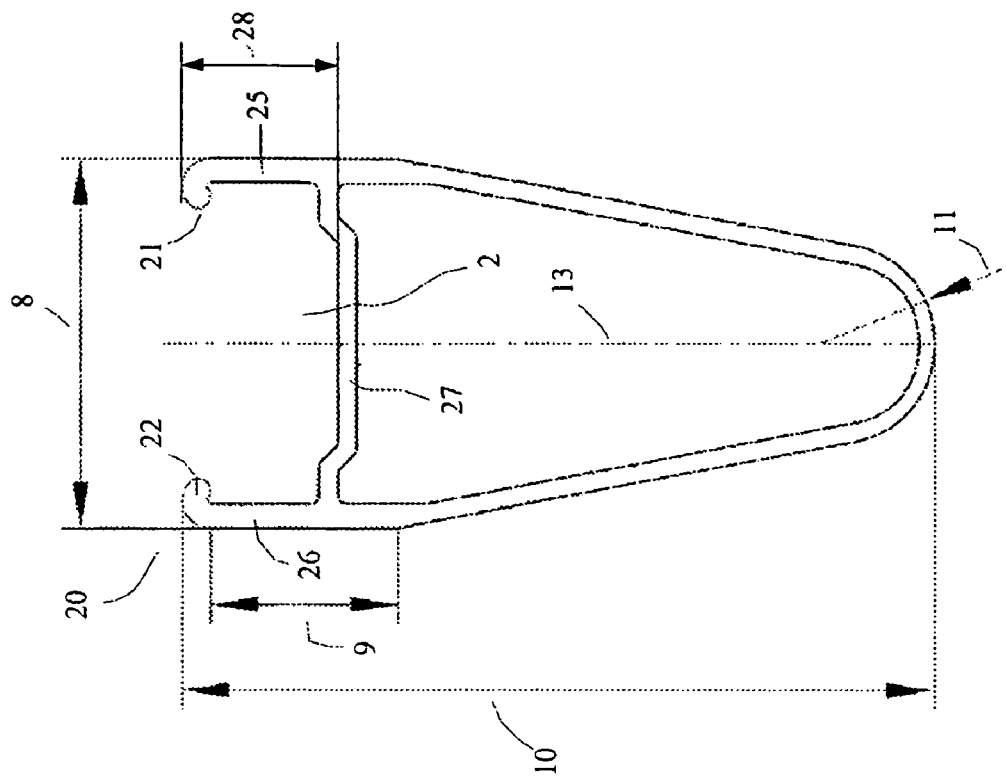
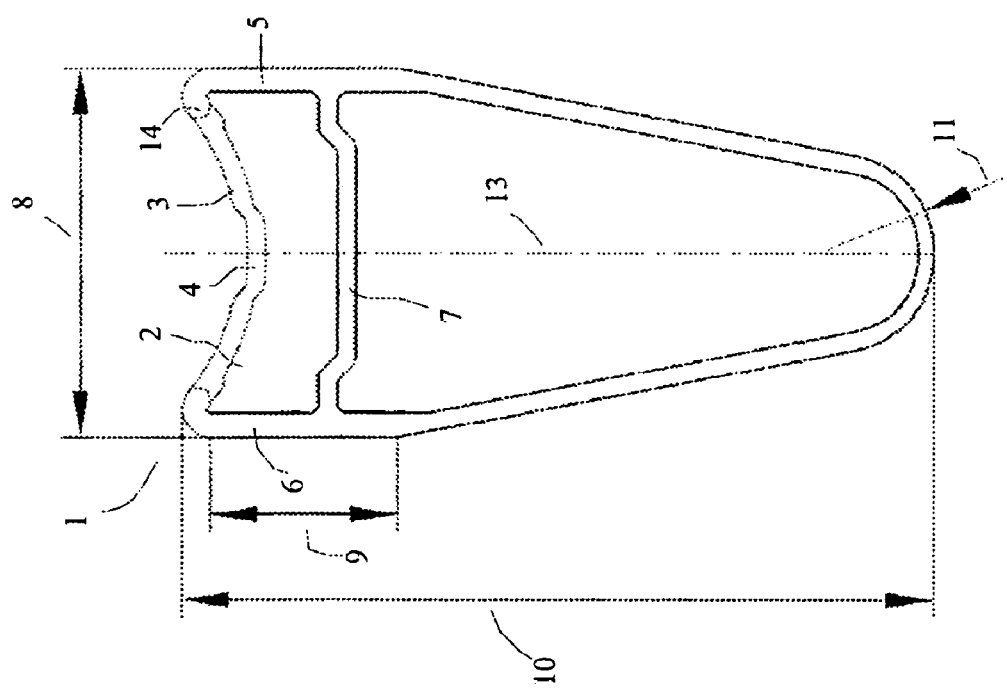
Fig. 1
Fig. 2

METHOD FOR MANUFACTURING A RIM

BACKGROUND

The invention relates to a method for manufacturing a rim, and a rim. Although the invention will be described below with respect to bicycle rims, the manufacture of rims for other cycles may be included according to the invention, in particular rims for other unicycles or multi-cycles, bicycle trailers or e.g. for wheelchairs.

In the field of bicycles in the professional and semi-professional field but also in the field of serious recreational cyclists the weight and stress tolerance of bicycle components plays a major role.

In bicycle racing, each gram of weight counts. Therefore professional and semiprofessional bicycle racers tend to use bicycles with tube tires for racing while wire tires are also used by amateur cyclists or in training rounds.

Also the manufacturing price is a major factor. Prices are substantially affected by the materials used, the molds required for manufacture and the extent of manufacturing work.

The tube tires used in bicycle sports have a tire casing forming a closed tube with the actual rubber or latex tire tube placed inside. Tube tires for bicycle sports are very narrow with typical diameters of approx. 18 to 25 mm. The weight may be e.g. approx. 200 to approx. 300 grams.

Most of the casings of tube tires known from the prior art are composed of two to three layers of rubber-coated cotton or nylon cloth, the carcass, reinforced by a rubber coat on the tread surface. One or two strips of cloth are frequently included. As a rule, the casing is stitched on the inside with a thin textile strip glued to the seam for protection.

This construction allows the carcass to be extremely lightweight and elastic while these tube tires can withstand very high tire pressures (12 bar). Their rolling resistance is thus particularly low.

Tube tires can only be mounted onto rims whose outer surface, the so-called rim base, is concaved. Rim flanges as used for rims for wire tires are absent. To retain the tube tire on the rim it must be glued on. To this purpose e.g. tire cement, a viscous glue or a tire adhesive tape is used.

Due to the high possible operating pressure tube tires have a low rolling resistance. It is, however, a drawback that in the case of tire failure, repair will be difficult and complicated. To patch the inner tube, the seam must be unstitched at the correct place in the casing and afterward re-sewn with a semicircular needle which requires practice to be successful. In the case of breakdowns they will as a rule be replaced by new ones.

Unlike tube tires, wire tires can be patched readily. However, the rolling resistance is higher as a rule. The wire tire, frequently referred to as "casing" or "coat", is not a closed tube but comprises wire-reinforced edges. The separate tube is loosely inserted into the wire tire. The wire-reinforced edges abut the rim flanges of the wire tire rim.

Tube tires or wire tires thus require specially matched rims manufactured separately since the structures of the two rim types differ.

Since the outer rim profiles of rims for wire tires differ from those of rims for tube tires, these types of rims require different preforms. For rims manufactured e.g. of a fibrous composite material, each rim type requires a separate mold. This increases the manufacturing costs since different molds must be stocked for these two types.

SUMMARY OF THE INVENTION

It is therefore the object of the present invention to provide a method which allows a more variable manufacture and a rim which allows conversion.

The method according to the invention serves to manufacture rims, in particular rims for bicycles. First a rim body is manufactured comprising at least one hollow space having one radially outer and one radially inner hollow-space wall. The method is performed such that the radially outer wall has a diameter matched to the diameter of a tube tire. Manufacturing the rim body is furthermore carried out such that the radially inner wall of the hollow space has a diameter matched to the diameter of a wire tire.

The rim according to the invention is in particular suitable for bicycles and comprises a rim body including a hollow space having one radially outer and one radially inner hollow-space wall wherein the radially outer hollow-space wall has a diameter suitable for receiving a tube tire and wherein the radially inner hollow-space wall has a diameter matched to the diameter of a wire tire.

The invention has many advantages. The invention allows to use a preform or a mold for manufacturing both a rim for tubeless tires and a rim for wire tires. The solution according to the invention provides for the rim body of the rim comprising a hollow space wherein its outer wall is matched to a tubeless tire while the inner wall is matched to a wire tire.

In a preferred specific embodiment of the method the outer hollow-space wall is removed. Thus a rim for wire tires is formed. This means that simple removal of the outer wall will convert the rim which now serves to receive wire tires.

The outer wall does not need to be entirely removed. It is sufficient to substantially remove it over a substantial portion. Removal of the outer wall aims at forming a rim for wire tires. Removing a corresponding portion is sufficient even if a portion remains.

Preferably the outer wall is milled off. This can readily be done automatically. However, other tools may be employed for removing the outer wall.

It is particularly preferred to remove the outer wall of the hollow space such that the side strips remain to form rim flanges. While the center portion is substantially removed, the side walls of the hollow space and optionally small portions of the outer wall remain, thus functioning as rim flanges. The rim flanges preferably comprise at their edges small, horizontal strips or in particular inwardly rounded recesses so as to provide generally hook-like rim flanges. With the tube inflated, the air pressure will urge the wire tire under the rim flanges of the wire tire rims, thus securing them against rolling off.

It is also conceivable to form bead-like thickenings at the radially outer edges of the rim flanges to enable a firm seat of a wire tire.

The rim flanges are shaped in particular by milling which allows a variable and defined shaping while concurrently obtaining high-quality surfaces.

According to another embodiment the specified object is fulfilled by a method for manufacturing a rim for wire tires, in particular for bicycles, wherein at least the following process steps are performed:

a) Manufacturing a rim body for wireless tires having a radially outward hollow space,
b) removing the outer hollow-space wall such that side strips remain to form rim flanges.

Preferred specific embodiments of all the configurations described above provide the radially inner hollow-space wall as the rim base for wire tires.

After removing the radially outer wall the hollow space is open and its cross-section will substantially be U-shaped with the "U" being open radially outwardly. The hollow-space sidewalls serve as rim flanges while the radially inner wall of the hollow space serves as the rim base.

All of the embodiments preferably provide that the rim body is at least in part manufactured of a fibrous composite material.

The rim is in particular entirely manufactured of a fibrous composite material. Specific portions may be made of other materials. It is for example conceivable that one reinforcement layer for the brake sidewalls consists of a ring of a metal such as aluminum or an aluminum alloy. Use of a combination of an aluminum section with fiber-reinforced portions is also conceivable. It is also possible to use different types of fibrous composite materials.

A rim of fibrous composite materials may be manufactured using various methods. Preferred methods include laminating, hand lay-up technique, fiber lapping, prepreg, and resin injection.

It is particularly preferred to manufacture the rim of a carbon fiber-reinforced and/or a glass fiber-reinforced composite material. Using multiple different reinforcing fibers is also possible. The composite material may per se be composed of any matrix material. It is for example possible to use a thermosetting matrix material.

For rims to be manufactured for wire tires the outer hollow-space wall must be removed from the finished preform. This process step of milling out the outer wall does not require significant extra work in particular for manufacturing fibrous composite rims since as a rule the rim flanges must in particular be refinished to obtain the final shape. In this respect milling out or removing the outer wall is not extensive extra work in manufacturing rims for wire tires. Using identical molds for both rim types will thus considerably reduce the total extent of manufacturing work.

It is particularly preferred to use a thermoplastic matrix material. Thermoplastic matrix materials offer considerable advantages since the material, not being very brittle, does not tend to splinter easily.

Preferably at least part of the fibers are reinforcing fibers and at least part of the fibers, a thermoplastic material. In manufacturing fibers are preferably used which consist in part of reinforcing fibers and in part of a thermoplastic matrix material.

Heating the fibers up to the melting temperature of the matrix material will make the matrix material melt and distribute homogeneously. Applying external pressure will achieve the final shape.

Manufacturing of the rim body or the rim is carried out by at least the following process steps:

a) placing the fibers in a mold,
b) heating the fibers,.
c) cooling the body.

A significant advantage of thermoplastic fiber materials is that before processing the materials keep nearly indefinitely and are not sticky. Thermoplastic materials do not age. This is an advantage over thermosetting raw materials. Moreover it is not necessary to store it in deep-freezing before processing since the materials keep indefinitely even at room temperatures. The raw materials will therefore not fuse together even in the case of power failure and thus also refrigeration failure. The material is dry and not sticky which is an advantage in handling.

Moreover, no vapors harmful to health will escape during storage and forming.

It is another advantage of thermoplastic materials that application of heat may have a self-healing effect on defects while thermosetting materials are susceptible to brittle fracture. In a rim manufactured according to the invention of a thermoplastic material having a small defect on the brake sidewall, the friction of the brake shoes on the rim side faces during braking may cause a local rise in temperature which may result in local re-fusing of the material such that the defect is healed. This is not the case with a conventional thermosetting fibrous composite material. On the other hand, thermosetting material is as a rule more favorable and extensive values of experience in manufacturing are available. Therefore a thermosetting fibrous composite material also offers advantages.

Another advantage is the break behavior of thermoplastic bicycle components. Unlike thermosetting components, thermoplastic bicycle components do not break abruptly and practically they do not splinter. Moreover such materials can be welded and machined better.

Another advantage is the considerably shorter manufacturing time. The matrix materials only need to be liquified in the furnace for the matrix to form. Thereafter the mold may be cooled. There is no need for a reaction time of two hours or more. A few minutes are sufficient.

This allows to manufacture a larger number of components per unit time with one mold since manufacturing time from start of placing until the following placing is reduced from more than two hours to e.g. 30 minutes or less. This means a manufacturing rate increased by a factor of up to four with one mold. Thus the manufacturing costs per piece are considerably reduced.

One specific embodiment of the invention uses two different fiber types namely, a first fiber type of a thermoplastic material and a second type of reinforcing fibers. It is possible to use parallel fibers of a matrix material and reinforcing fibers.

It is also preferred that at least some fibers are combination fibers consisting of both a reinforcing fiber and a thermoplastic material.

It is conceivable to have the combination fibers consist of a core and a casing wherein preferably the core consists of at least one reinforcing fiber and the casing of a thermoplastic material. It is e.g. conceivable that individual reinforcing fibers are enclosed in a matrix material of e.g. polyamide.

Prefabricated tissues, hoses, mats and/or sections may in particular be used for manufacture.

In all cases it is preferred that the outer hollow space wall of the rim be concaved so as to be prepared for operation with a tube tire.

In order to ensure a better guiding for the tube tire, a groove in the center of the rim base may be provided over the perimeter for guiding the tire seam. This enhances support for the tire and thus operational safety.

The inner hollow-space wall is preferably configured substantially planar.

BRIEF DESCRIPTION OF THE DRAWINGS

Further advantages and embodiments of the present invention can be taken from the accompanying drawings.

FIG. 1 is a first embodiment of the rim manufactured according to the invention as a tube tire rim in a schematic cross-section;

FIG. 2 is a second embodiment of the rim manufactured according to the invention as a wire tire rim in a schematic cross-section;

DETAILED DESCRIPTION OF THE PREFERRED EMBODIMENT

Figure 3:
FIG. 3 is a combination fiber for manufacturing a rim according to the invention in section.

FIG. 1 shows a cross-section of a rim 1 according to the invention for tube tires for bicycles as used in the field of sports and in particular in racing.

The rim 1 for tube tires comprises a hollow space 2 which is limited on the radially outer face by an outer wall 3 which in this case serves as a rim base. Furthermore the hollow space 2 is enclosed in sidewalls 5 and 6 toward the sides and radially inwardly, in the inner rim wall 7. Another annular hollow space 12 extends further radially inwardly with sidewalls tapering radially inwardly and ultimately converging, passing into a radius 11.

In the embodiment the height 10 of the rim is 40 mm while the height of the sides 5, 6 serving as brake sidewalls is approximately 10 mm. The width 8 of the entire rim in this case is approximately 20 mm and the radius 11, approximately 6 mm. It is pointed out though that other dimensions are also possible. For example the height 10 may be 33 mm while the width is also approximately 20 mm. Higher and lower values are also possible.

The outer wall 3 of the hollow space 2 serves as rim base and is generally concaved i.e. in the region of the center plane 13 the outer diameter of the rim base is smaller or even the smallest while toward the lateral sidewalls 5, 6 it is larger in diameter.

The center region of the tube tire rim 1 is provided with a groove-shaped recess 4 to enable centering and alignment of the tube tire on the rim 1. This reduces the quantity of glue required for gluing on a tube tire (not shown) while enhancing the reliability of the tube tire fit on the rim.

FIG. 2 illustrates a rim 20 for wire tires according to the invention also manufactured from the preform of the rim 1. The rim 20 can in particular be manufactured by processing the rim 1 from FIG. 1.

To convert the rim 1 for tube tires into a rim 20 for wire tires the outer wall of the hollow space 2, which is the rim base 3 of the rim 1, is removed up to line 14 in the illustration of FIG. 1. Preferably this is done by milling.

The sidewalls 5, 6 thus form the rim flanges 25, 26, the ends 21 and 22 of which project laterally inwardly to safely and reliably retain the wire tires on the rim 20 by the projection.

To ensure suitability for conversion the distance 28 from the upper edge of the inner wall 7 to the upper edge of the rim sidewalls 5, 6 or to the outer wall 3 is adjusted such that if the wall 3 is present it serves as the rim base for tube tires, while with the wall 3 milled out, the inner wall 7 serves as the rim base 27.

The rims 1 or 20 may be manufactured of different materials, e.g. of aluminum or aluminum alloys or titanium or titanium alloys. It is preferred to manufacture them at least in part and in particular substantially entirely of a fibrous composite material which may be thermosetting but is preferably thermoplastic.

Figure 4:
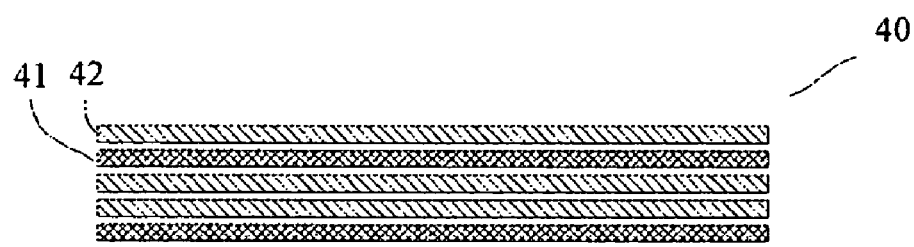
FIG. 4 is an alternative to the combination fiber according to FIG. 3, parallel reinforcing and matrix fibers for manufacturing a rim according to the invention.

FIG. 4 shows a longitudinal section of a combination fiber 30 as it is preferably used for manufacturing the rim according to the invention. The combination fiber 30 in this embodiment comprises an inner core fiber as a reinforcing fiber 31 and an outer casing layer 32 consisting of a thermoplastic material.

The method according to the invention uses e.g. combination fibers 30. To manufacture the rim 1 shown in FIG. 1, a combination fiber 30 may be wound around a bobbin core. The wrapped bobbin core is then placed in a mold which is closed. After heating the mold for approximately 5 to 10 minutes to—in this case—approximately 220° C. the outer casing layer 32 liquefies and fuses together such that a matrix coat is formed in which the reinforcing fibers 31 configured as carbon fibers are embedded. The entire mold is quenched in a dip tank for approximately 2 to 3 minutes until the temperature has dropped far enough for the mold to be opened and the rim to be taken out.

The same method may be applied with the fibers 40 placed in parallel and illustrated schematically in FIG. 4 wherein in addition to reinforcing fibers 41, thermoplastic fibers 42 or matrix fibers are used.

Figure 5:
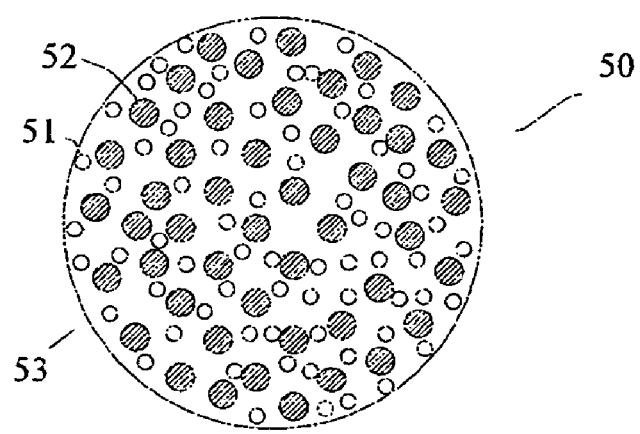
FIG. 5 is a top view of a fiber strand of reinforcing and matrix fibers which may be used as well for manufacturing a bicycle component according to the invention.

FIG. 5 is a top view of a fiber strand 50 comprising a plurality of thermoplastic fibers 51 and a plurality of reinforcing fibers 52. To retain the individual fibers in the strand, an external structure 53 may be provided that is configured e.g. net-like and may consist of a range of different materials.

The fiber strand 50 may, like the combination fiber 30 or the parallel fibers 40, be used for the manufacture of bicycle components. To facilitate manufacturing, in particular prefabricated cords and in particular woven mats are used which may comprise combination fibers 30, parallel fibers 40 or fiber strands 50.

To manufacture the rim 1, woven mats may also be used. After placing the woven mats in the mold, the mold is closed and heated to a temperature above the melting temperature of the thermoplastic material. The thermoplastic fibers fuse together, forming the matrix. After cooling the mold e.g. by dipping or sprinkling with water, the component can be removed.

A bobbin core may be used in manufacture consisting e.g. of foam and permanently remaining in the rim 1. The projecting ends may be layered to overlap, forming the rim base 3 of the rim 1 for tube tires. After milling out if required and corresponding shaping, the remainders of the ends form the rim flanges 25, 26 of the rim 20 for wire tires.

Manufacturing may include the use of prepregs placed on a bobbin core. Prepregs may consist of thermosetting fibrous composite materials or else of thermoplastic fibers and of reinforcing fibers.

In all of the cases a pressure may be applied to the fibers or the cloth in the mold.

The invention claimed is:

1. A method for manufacturing a rim, in particular for bicycles, comprising:
   manufacturing a rim body having a hollow space defined by opposing sidewalls, comprising a continuous, radially outer hollow-spaced wall and a radially inner hollow-space wall;
   providing the radially outer hollow-space wall with a diameter matched to a diameter of a tube tire, wherein the outer hollow-space wall serves as a rim base for the tube tire; and
   providing the radially inner hollow-space wall with a diameter matched to a diameter of a wire tire, wherein the outer hollow-space wall is removed such that the inner hollow-space wall serves as a rim support for the wire tire and the opposing sidewalls remain to form rim flanges adapted for retaining the wire tire.

2. The method according to claim 1 wherein the rim body is at least in part manufactured of a fibrous composite material.

3. The method according to claim 2 wherein the fibrous composite material includes a thermoplastic matrix material.

4. The method according to claim 2 wherein at least part of the fibers are reinforcing fibers and at least part of the fibers consist of a thermoplastic material.

5. The method according to claim 4 wherein at least two different fiber types are used namely, a first fiber type of a thermoplastic material and a second type of reinforcing fibers.

6. The method according to claim 4 wherein at least some fibers are combination fibers consisting of both at least one reinforcing fiber and a thermoplastic material.

7. The method according to claim 4 wherein the combination fibers consist of a core and a casing wherein preferably the core consists of at least one reinforcing fiber and the casing of a thermoplastic material.

8. The method according to claim 2 wherein prefabricated tissues, hoses, mats and/or sections of the fibrous composite material are used to manufacture the rim body.

* * * * *